(12) United States Patent
Jung et al.

(10) Patent No.: US 8,854,780 B2
(45) Date of Patent: Oct. 7, 2014

(54) PROTECTION CIRCUIT OF BATTERY PACK AND BATTERY PACK USING THE SAME

(75) Inventors: Yeonri Jung, Yongin-si (KR); Sejin Ji, Yongin-si (KR)

(73) Assignee: Samsung SDI Co., Ltd., Yongin-si, Gyeonggi-Do (KR)

( * ) Notice: Subject to any disclaimer, the term of this patent is extended or adjusted under 35 U.S.C. 154(b) by 151 days.

(21) Appl. No.: 13/559,418

(22) Filed: Jul. 26, 2012

(65) Prior Publication Data

US 2013/0148246 A1    Jun. 13, 2013

(30) Foreign Application Priority Data

Dec. 12, 2011  (KR) ................... 10-2011-0133291

(51) Int. Cl.
*H02H 3/00*      (2006.01)
(52) U.S. Cl.
USPC ........................................................... 361/79

(58) Field of Classification Search
CPC ............ H02H 7/18; H02H 3/006; H02H 3/00
USPC ............................................................ 361/79
See application file for complete search history.

(56) References Cited

U.S. PATENT DOCUMENTS 5,493,199 A * 2/1996 Koenck et al. ................ 320/106
2009/0220825 A1* 9/2009 Nakashima et al. ............. 429/7

FOREIGN PATENT DOCUMENTS

| JP | 2007-135310 A | 5/2007 |
| KR | 10-0210449 B1 | 4/1999 |
| KR | 10-2003-0081985 A | 10/2003 |

* cited by examiner

*Primary Examiner* — Scott Bauer
(74) *Attorney, Agent, or Firm* — Knobbe, Martens, Olson & Bear, LLP

(57) ABSTRACT

A programmable protection circuit of a battery pack and a battery back are disclosed. The protection circuit includes programmable protection level specifications based on battery characteristics by incorporating a storage unit therein. Accordingly, the protection circuit can be use with various batteries in various battery packs, thereby saving design and manufacturing costs.

17 Claims, 5 Drawing Sheets

FIG. 3

| | |
|---|---|
| OVER-CHARGE VOLTAGE : | DVcoc |
| OVER-DISCHARGE VOLTAGE : | DVdoc |
| OVER-CHARGE CURRENT : | DIcoc |
| OVER-DISCHARGE CURRENT : | DIdoc |

SP1

PROTECTION CIRCUIT OF BATTERY PACK AND BATTERY PACK USING THE SAME

CROSS-REFERENCE TO RELATED APPLICATIONS

This application claims the benefit of Korean Patent Application No. 10-2011-0133291 filed on Dec. 12, 2011, the contents of which are incorporated herein by reference in their entirety.

BACKGROUND

1. Field

The disclosed technology relates to a protection circuit of a battery pack and a battery pack using the same.

2. Description of the Related Technology

Rechargeable secondary batteries are used in portable electronic devices such as cellular phones, personal communications services (PCS), notebook computers, camcorders, personal digital assistants (PDA), or the like. In particular, various technologies for secondary batteries, such as nickel-cadmium, lead, nickel metal hydride (NiMH), lithium ion, lithium polymer, metallic lithium, air-zinc, and so on, are being developed. A battery pack includes a secondary battery and a protection circuit, which controls charging and discharging of the rechargeable secondary battery. The circuit protects the battery from over-charge or over-discharge, which are well know undesirable conditions of battery cycling.

The protection circuit of the battery pack includes protection level specifications as references for determining over-charge, over-discharge, or over-current for the purpose of protecting the battery. Accordingly, in the protection circuit of the battery pack, an over-charge reference voltage, an over-discharge reference voltage, an over-charge reference current, and an over-discharge reference current are set to fixed values at the time of circuit design. Based on the set values, a battery pack condition is determined. If a new battery is developed, a protection circuit for the battery pack having custom protection level specifications of fixed values needs to be newly designed, resulting in a misallocation of engineering resources and time loss due to circuit development.

SUMMARY OF CERTAIN INVENTIVE ASPECTS

One inventive aspect is a protection circuit for a battery pack. The protection circuit includes an external terminal configured to be connected to a charger or an external device, a cell terminal configured to be connected to a battery, and a storage unit for storing one or more protection level specifications, where the specifications each include data of over-charge and over-discharge reference currents and over-charge and over-discharge reference voltages for protecting the battery. The protection circuit also includes a digital-to-analog (D/A) converter electrically connected to the storage unit and configured to read the protection level specifications stored in the storage unit and to convert the protection level specifications into analog protection level specifications as analog data, a measurement unit connected to the cell terminal and configured to measure charge and discharge voltages and charge and discharge currents of the battery, and a comparison unit electrically connected to the measurement unit and the D/A converter and configured to compare the charge and discharge voltages and the charge and discharge currents measured by the measurement unit with the analog protection level specifications from the D/A converter. The protection circuit also includes a charge/discharge field effect transistor (FET) connected between the cell terminal and the external terminal in series and configured to be turned off during over-charge and over-discharge, and a controller unit electrically connected to the comparison unit and the charge/discharge FET, and configured to determine over-charge and over-discharge according to a signal output from the comparison unit, and configured to control driving of the charge/discharge FET.

Another inventive aspect is a battery pack, including a battery, and a protection circuit. The protection circuit includes an external terminal configured to be connected to a charger or an external device, a cell terminal configured to be connected to a battery, and a storage unit for storing protection level specifications, where the specifications include data of over-charge and over-discharge reference currents and over-charge and over-discharge reference voltages for protecting the battery. The protection circuit also includes a digital-to-analog (D/A) converter electrically connected to the storage unit and configured to read the protection level specifications stored in the storage unit and to convert the protection level specifications into analog protection level specifications as analog data, a measurement unit connected to the cell terminal and configured to measure charge and discharge voltages and charge and discharge currents of the battery, and a comparison unit electrically connected to the measurement unit and the D/A converter and configured to compare the charge and discharge voltages and the charge and discharge currents measured by the measurement unit with the analog protection level specifications from the D/A converter. The protection circuit also includes a charge/discharge field effect transistor (FET) connected between the cell terminal and the external terminal in series and configured to be turned off during over-charge and over-discharge, and a controller unit electrically connected to the comparison unit and the charge/discharge FET, and configured to determine over-charge and over-discharge according to a signal output from the comparison unit, and configured to control driving of the charge/discharge FET.

BRIEF DESCRIPTION OF THE DRAWINGS

Various aspects, features and advantages will be more apparent from the following detailed description in conjunction with the accompanying drawings, in which:

FIG. 3 is a look-up table illustrating an example of data storage of a storage unit shown in FIG. 1;

DETAILED DESCRIPTION OF CERTAIN INVENTIVE EMBODIMENTS

Figure 1:
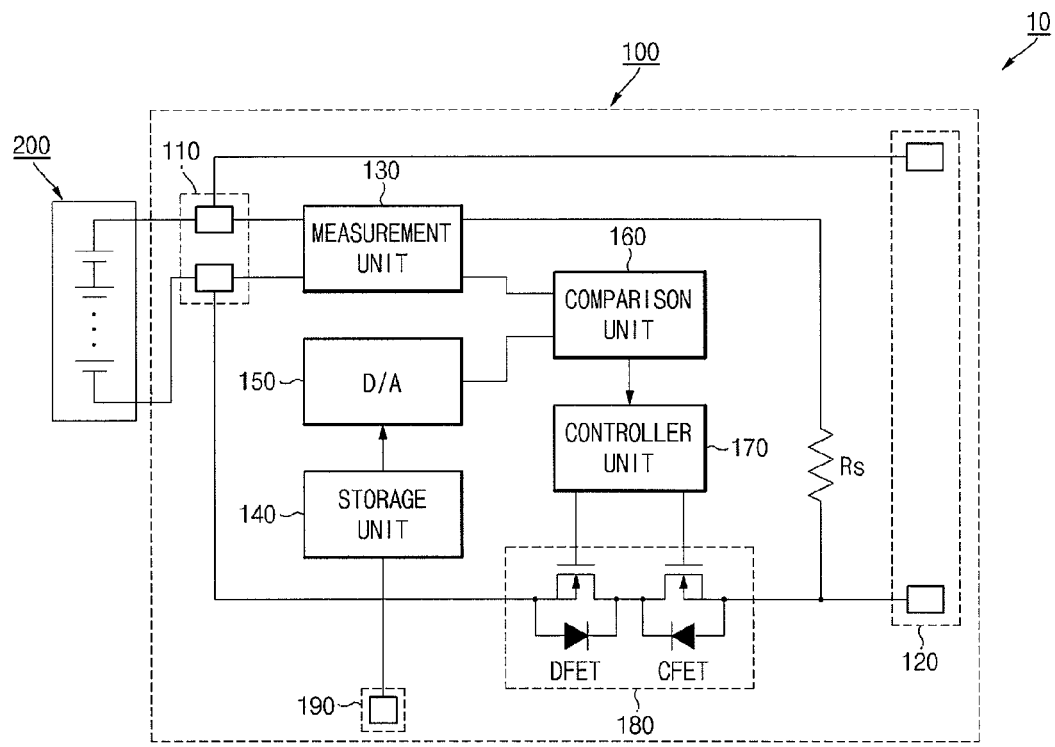
FIG. 1 is a circuit view of a battery pack including a protection circuit and batteries according to an embodiment.

Hereinafter, exemplary embodiments are described in detail with reference to the accompanying drawings. The same reference numerals are generally used throughout the drawings to refer to the same or like elements.

Referring to FIG. 1, a circuit view of a battery pack including a protection circuit and batteries according to an embodiment is illustrated. As illustrated in FIG. 1, the battery pack 10 includes a protection circuit 100 and batteries 200. The protection circuit 100 may, for example, be formed by arranging an electric element on a printed circuit board (PCB) by spot welding or soldering. The batteries 200 may include one or more of rechargeable bare cells, and the bare cells may have one of, for example, prismatic, cylindrical and pouch shapes.

The protection circuit 100 includes a cell terminal 110, an external terminal 120, a measurement unit 130, a storage unit 140, a D/A converter 150, a comparison unit 160, a controller unit 170, a charge/discharge FET 180 and a data input terminal 190. The following description is made with reference to a circumstance where the comparison unit 160 has a structure shown in FIG. 2. In some embodiments, alternative structures are used.

The cell terminal 110 includes two terminals configured to be electrically connected to a positive electrode and a negative electrode of a battery 200. The external terminal 120 includes two terminals, which are connected to a charger or an external device. If the external terminal 120 is connected to a charger, the battery 200 connected to the cell terminal 110 can be charged. If the external terminal 120 is connected to an external device, the battery 200 connected to the cell terminal 110 can be discharged. The external terminal 120 may be connected to the cell terminal 110 in parallel.

The measurement unit 130 is electrically connected to the cell terminal 110 and is electrically connected to a sensor resistor (Rs) provided between the cell terminal 110 and the external terminal 120. Here, the sensor resistor (Rs) is a resistor for sensing a current flowing in a high-current path between the cell terminal 110 and the external terminal 120. In addition, since a resistance value of the sensor resistor (Rs) is a known value, the measurement unit 130 may sense charge/discharge currents of the battery 200 and an external short-circuiting state if a voltage applied to the sensor resistor (Rs) is sensed. In addition, the measurement unit 130 may measure charge/discharge voltages of the battery 200 by measuring voltages of opposite ends of the battery 200.

In addition, the storage unit 140 is electrically connected to the D/A converter 150 and stores protection level specifications as data used to generate reference voltages for protecting the battery 200 from over-charge and over-discharge. The protection level specifications may, for example, include data of an over-charge reference voltage, an over-discharge reference voltage, an over-charge reference current and an over-discharge reference current depending on characteristics of the battery 200 connected to the cell terminal 110. Other voltages may also be included.

The storage unit 140 may include a read only memory (ROM), an electrically erasable programmable read-only memory (EEPROM), a flash memory and equivalent memory devices, which can store data of protection level specifications. The storage unit 140 may store one or more protection level specifications depending on characteristics of the battery 200 to be connected to the cell terminal 110. An example of the protection level specification (Sp1) stored in the storage unit 140 is shown in FIG. 3.

When the protection circuit 100 of a battery pack is designed, the storage unit 140 does not yet store protection level specifications. The protection level specification (SP1) is recorded in the storage unit 140 through the data input terminal 190 electrically connected to the storage unit 140 according to the characteristics of the battery 200 connected to the cell terminal 110 of the protection circuit 100 before the battery pack 10 is released for commercial use. Accordingly, before the battery pack 10 is released for commercial use or sold, the protection level specification Sp1 corresponding to the characteristics of the battery 200 connected to the protection circuit 100 of the battery pack are recorded in the storage unit 140. In this embodiment, this is accomplished when the protection level specification Sp1 is input through the data input terminal 190. In this embodiment, the storage unit 140 stores data DVcoc, DVdoc, DIcoc and DIdoc for the over-charge reference voltage, the over-discharge reference voltage, the over-charge reference current and the over-discharge reference current, corresponding to the protection level specification Sp1 as references for protecting the battery pack 10.

Figure 4:
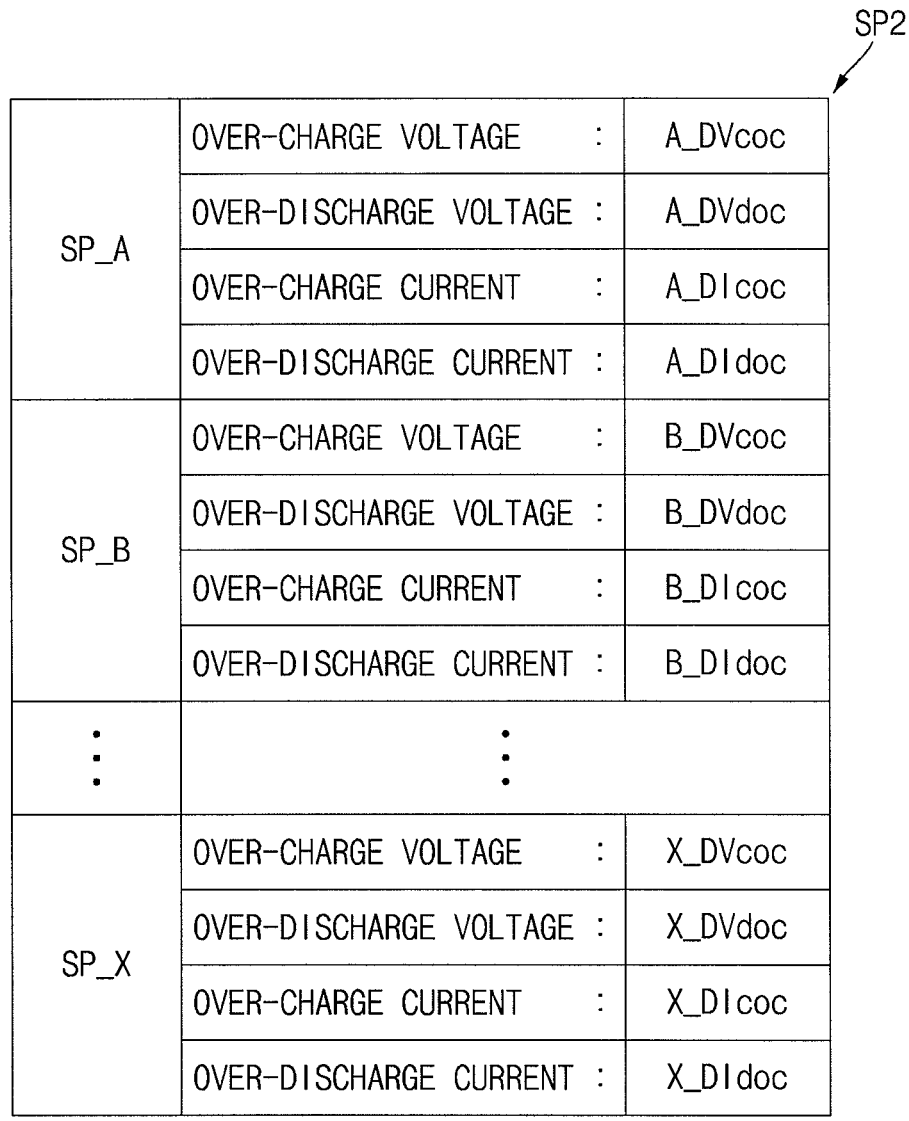
FIG. 4 is a look-up table illustrating another example of data storage of a storage unit shown in FIG. 1.

Alternatively, the storage unit 140 may store multiple protection level specifications. An example of a protection level specification (Sp2) stored in the storage unit 140 may be implemented by a look-up table shown in FIG. 4.

Multiple protection level specifications (SP_A, SP_B, ..., SP_X) for multiple batteries 100 to be connected to the cell terminal 110 may be stored in the storage unit 140 in the form of a look-up table. The battery pack 10 is configured such that one of multiple protection level specifications (SP_A, SP_B, ..., SP_X) is read according to the characteristics of the battery 200 connected to the cell terminal 110 of the protection circuit 100 before the battery pack 10 is released for commercial use.

Accordingly, before the battery pack 10 is released for commercial use, if, among the multiple protection level specifications, the protection level specification corresponding to the characteristics of the battery 200 connected to the protection circuit 100 is entered through the data input terminal 190, the data for the appropriate protection level specification is read from the storage unit 140

Among the multiple protection level specifications (SP_A, SP_B, ..., SP_X) stored in the storage unit 140, the protection level specification (Sp_X) includes arbitrary values, but the number of data stored and values of data output are not specifically limited to a protection level specification (Sp_X).

As described above, since the protection circuit 100 of a battery pack including the storage unit 140 may store or set protection level specifications depending on the characteristics of the battery 200, it can be included in a new battery pack, thereby minimizing misallocation of engineering resources for fabricating the protection circuit 100 of the new battery pack. In addition, since the protection circuit 100 of a battery pack including the storage unit 140 may store or set protection level specifications depending on the characteristics of the battery 200 connected to the cell terminal 110, it can be compatibly used with new battery packs.

The D/A converter 150 is electrically connected between the storage unit 140 and the comparison unit 160. The D/A converter 150 converts digital data of protection level specifications read from the storage unit 140 into analog data of analog protection level specifications.

The comparison unit 160 is electrically connected to the measurement unit 130, the D/A converter 150 and the controller unit 170. The comparison unit 160 compares the charge/discharge currents and the charge/discharge voltages measured by the measurement unit 130 with the analog protection level specifications output from the D/A converter 150 and outputs a signal indicative of a state of the battery pack as being normal or abnormal to the controller unit 170.

Figure 2:
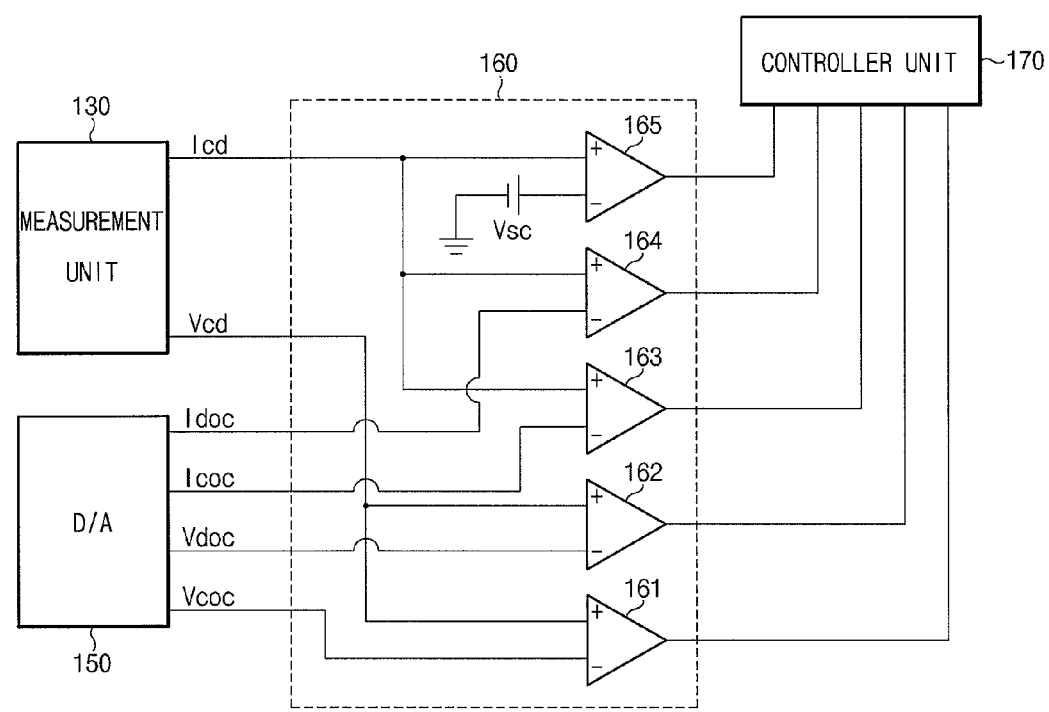
FIG. 2 is an internal circuit view illustrating an example of a comparison unit shown in FIG. 1.

As illustrated in FIG. 2, the comparison unit 160 includes an over-charge voltage comparator 161, an over-discharge voltage comparator 162, an over-charge current comparator 163, an over-discharge current comparator 164 and a short-circuiting comparator 165. The respective comparators of the comparison unit 160 may be comparators for comparing voltage values.

The over-charge voltage comparator 161 compares the charge/discharge voltage (Vcd) measured by the measurement unit 130 with data of the analog protection level specifications read from the storage unit 140 and transmitted through the D/A converter 150, that is, the over-charge reference voltage (Vcoc). The over-charge voltage comparator 161 compares the charge/discharge voltage (Vcd) with the over-charge reference voltage (Vcoc) and outputs a comparison result to the controller unit 170. If the charge/discharge voltage (Vcd) is greater than the over-charge reference voltage (Vcoc), the over-charge voltage comparator 161 applies a high level output signal of to the controller unit 170.

The over-discharge voltage comparator 162 compares the charge/discharge voltage (Vcd) measured by the measurement unit 130 with data of the analog protection level specifications read from the storage unit 140 and transmitted through the D/A converter 150, that is, the over-discharge reference voltage (Vdoc). The over-discharge voltage comparator 162 compares the charge/discharge voltage (Vcd) with the over-discharge reference voltage (Vdoc) and outputs a comparison result to the controller unit 170. If the charge/discharge voltage (Vcd) is less than the over-discharge reference voltage (Vdoc), the over-discharge voltage comparator 162 applies a low level output signal of to the controller unit 170.

The over-charge current comparator 163 compares a voltage (Icd) for the charge/discharge current measured by the measurement unit 130 with data of the analog protection level specifications read from the storage unit 140 and transmitted through the D/A converter 150, that is, the over-charge reference current. Here, the voltage (Icd) for the charge/discharge current measured by the measurement unit 130 means a voltage applied to the sensor resistor (Rs). In addition, the over-charge reference current read from the storage unit 140 is a value obtained by converting the over-charge reference current for determining over-charge into a voltage value for the sensor resistor (Rs). Accordingly, the over-charge current comparator 163 compares the voltage (Icd) for the charge/discharge current measured by the measurement unit 130 with the voltage (Icoc) for the over-charge reference current. In addition, the over-charge current comparator 163 compares the voltage (Icd) for the charge/discharge current with the voltage (Icoc) for the over-charge reference current and outputs a comparison result to the controller unit 170. If the voltage (Icd) for the charge/discharge current is greater than the voltage (Icoc) for the over-charge reference current, the over-charge current comparator 163 applies a high level output signal to the controller unit 170.

The over-discharge current comparator 164 compares the voltage (Icd) for the charge/discharge current measured by the measurement unit 130 with data of the analog protection level specifications read from the storage unit 140 and transmitted through the D/A converter 150, that is, the over-discharge reference current. Here, the voltage (Icd) for the charge/discharge current measured by the measurement unit 130 means a voltage applied to the sensor resistor (Rs). In addition, the over-discharge reference current read from the storage unit 140 is a value obtained by converting the over-discharge reference current for determining over-discharge into a voltage value for the sensor resistor (Rs). Accordingly, the over-discharge current comparator 164 compares the voltage (Icd) for the charge/discharge current measured by the measurement unit 130 with the voltage (Idoc) for the over-discharge reference current. In addition, the over-discharge current comparator 164 compares the voltage (Icd) for the charge/discharge current with the voltage (Idoc) for the over-discharge reference current and outputs a comparison result to the controller unit 170. If the voltage (Icd) for the charge/discharge current is less than the voltage (Idoc) for the over-discharge reference current, the over-discharge current comparator 164 applies a low level output signal to the controller unit 170.

The short-circuiting comparator 165 compares the voltage (Icd) for the charge/discharge current measured by the measurement unit 130 with short-circuiting reference voltage (Vsc) set as a fixed value. The short-circuiting comparator 165 compares the voltage (Icd) for the charge/discharge current with the short-circuiting reference voltage (Vsc) and outputs a comparison result to the controller unit 170. If the voltage (Icd) for the charge/discharge current is greater than the short-circuiting reference voltage (Vsc), the short-circuiting comparator 165 applies a high level output signal to the controller unit 170.

Figure 5:
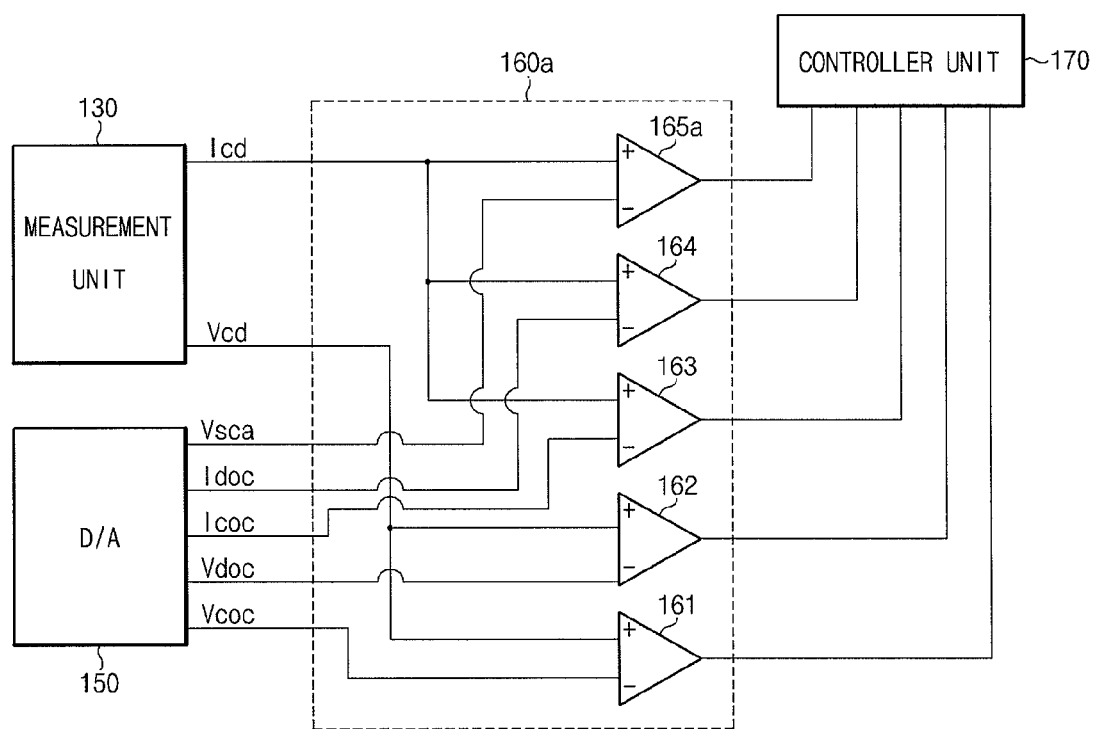
FIG. 5 is an internal circuit view illustrating another example of a comparison unit shown in FIG. 1.

Comparison unit 160a is shown in FIG. 5. Comparison unit 160a includes an over-charge voltage comparator 161, an over-discharge voltage comparator 162, an over-charge current comparator 163, an over-discharge current comparator 164 and a short-circuiting comparator 165a.

The over-charge voltage comparator 161, the over-discharge voltage comparator 162, the over-charge current comparator 163 and the over-discharge current comparator 164 may have the same connection configuration as that of the comparison unit 160 shown in FIG. 2, the following description will focus on the short-circuiting comparator 165a.

In this embodiment, short-circuiting comparator 165a compares the voltage (Icd) for the charge/discharge current measured by the measurement unit 130 with the data of analog protection level specifications read from the storage unit 140 and transmitted through the D/A converter 150, that is, a short-circuiting reference voltage (Vsca).

Here, the protection level specifications stored in the storage unit 140 include data of the over-charge reference voltage, the over-discharge reference voltage, the over-charge reference current and the over-discharge reference current. The protection level specifications stored in the storage unit 140 further include data of the short-circuiting reference voltage used as the standard for protecting the battery 200 from being short-circuited. Here, the data of the short-circuiting reference voltage included in the protection level specifications is a value depending on the characteristics of the battery 200 connected to the cell terminal 110.

The voltage for the charge/discharge current measured by the measurement unit 130 means a voltage (Icd) applied to the sensor resistor (Rs). The short-circuiting reference voltage read from the storage unit 140 is a voltage value for determining whether the battery and the high-current path are short-circuited or not.

The short-circuiting comparator 165a compares the voltage (Icd) for the charge/discharge current with the data of the short-circuiting reference voltage (Vsca) transmitted from the D/A converter 150 and outputs a comparison result to the controller unit 170. If the voltage (Icd) for the charge/discharge current is greater than the data of the short-circuiting reference voltage (Vsca), the short-circuiting comparator 165a applies a high-level output signal to the controller unit 170.

In addition, as shown in FIG. 1, the controller unit 170 is connected to the charge/discharge FET 180, and controls a charge FET (CFET) to perform a charge operation of the battery 200 is charged, and a discharge FET (DFET) to perform a discharge operation of the battery 200. In addition, the controller unit 170 is connected to the comparison unit 160, and controls driving of the charge/discharge FET 180 by determining over-charge, over-discharge and short-circuiting using the respective comparator output signals applied from the comparison unit 160. Accordingly, the controller unit 170 controls the charge/discharge FET 180 if an over-current is generated due to over-discharge, over-charge or short-circuiting to shut off the electric flow to prevent charging or discharging.

If at least one of signals output from the over-charge voltage comparator 161 and the over-charge current comparator 163 of the comparison unit 160 is at a high level, the controller unit 170 determines that the battery pack 10 is over-charged. In order to prevent driving of the battery pack 10 due to over-charge, the controller unit 170 turns off the charge FET (CFET) of the charge/discharge FET 180.

In addition, if at least one of signals output from the over-discharge voltage comparator 162 and the over-discharge current comparator 164 of the comparison unit 160 is at a low level, the controller unit 170 determines that the battery pack 10 is over-discharged. In order to prevent driving of the battery pack 10 due to over-discharge, the controller unit 170 turns off the discharge FET (DFET) of the charge/discharge FET 180.

In addition, if a signal output from the short-circuiting comparator 165 of the comparison unit 160 is at a high level, the controller unit 170 determines that the battery pack 10 is short-circuited. Here, in order to prevent driving of the battery pack 10 due to short-circuiting, the controller unit 170 turns off both of the charge FET (CFET) and the discharge FET (DFET) of the charge/discharge FET 180.

The charge/discharge FET 180 includes a charge FET (CFET) and a discharge FET (DFET) connected to a high-current path between the cell terminal 110 and the external terminal 120, and has a control electrode electrically connected to the controller unit 170, so that it is driven under the control of the controller unit 170. In the charge/discharge FET 180, the discharge FET (DFET) is turned on during discharging, and the charge FET (CFET) is turned on during charging, thereby performing discharging/charging operation of the battery 200.

In addition, the charge/discharge FET 180 is turned off by a control signal of the controller unit 170 if an abnormality, such as over-discharge, over-charge or over-current, occurs, thereby preventing discharging/charging operations. The charge/discharge FET 180 consists of field effect transistors (FETs), which are N- or P-type FETs.

As described above, in the protection circuit of a battery pack and the battery pack using the same, because protection level specifications depending on the characteristics of the battery 200 can be set and the protection circuit can be included in a new battery pack, misallocation of engineering resources for fabricating a protection circuit of the new battery pack can be minimized and the protection circuit can be compatibly used with new battery packs.

Although various aspects of a protection circuit of a battery pack and a battery pack using the same have been described with reference to certain exemplary embodiments thereof, it will be understood by those skilled in the art that a variety of modifications and variations may be made to the embodiments without departing from the spirit or scope of the present invention.

What is claimed is:

1. A protection circuit for a battery pack, the protection circuit comprising:
    an external terminal configured to be connected to a charger or an external device;
    a cell terminal configured to be connected to a battery;
    a storage unit for storing a plurality of protection level specifications of multiple batteries, wherein the specifications each include data of over-charge and over-discharge reference currents and over-charge and over-discharge reference voltages for protecting the battery;
    a digital-to-analog (D/A) converter electrically connected to the storage unit and configured to read the protection level specifications stored in the storage unit and to convert the protection level specifications into analog protection level specifications as analog data;
    a measurement unit connected to the cell terminal and configured to measure charge and discharge voltages and charge and discharge currents of the battery;
    a comparison unit electrically connected to the measurement unit and the D/A converter and configured to compare the charge and discharge voltages and the charge and discharge currents measured by the measurement unit with the analog protection level specifications from the D/A converter;
    a charge/discharge field effect transistor (FET) connected between the cell terminal and the external terminal in series and configured to be turned off during over-charge and over-discharge;
    a controller unit electrically connected to the comparison unit and the charge/discharge FET, and configured to determine over-charge and over-discharge according to a signal output from the comparison unit, and configured to control driving of the charge/discharge FET; and
    wherein the storage unit receives and stores the protection level specifications based on characteristics of multiple batteries and the storage unit stores multiple protection level specifications and is configured to read one of the protection level specifications according to characteristics of the battery.

2. The protection circuit of claim 1, further comprising a data input terminal electrically connected to the storage unit and configured to transmit the protection level specifications to the storage unit.

3. The protection circuit of claim 1, further comprising a data input terminal electrically connected to the storage unit and configured to select one of the protection level specifications stored in the storage unit to be read.

4. The protection circuit of claim 1, wherein the comparison unit comprises:
    an over-charge voltage comparator that compares the charge and discharge voltages measured by the measurement unit with the over-charge reference voltage of the analog protection level specifications transmitted from the D/A converter; and
    an over-discharge voltage comparator that compares the charge and discharge voltages measured by the measurement unit with the over-discharge reference voltage of the analog protection level specifications transmitted from the D/A converter.

5. The protection circuit of claim 4, wherein the comparison unit comprises:
    an over-charge current comparator that compares voltages for the charge and discharge currents measured by the measurement unit with voltages for the over-charge reference currents of the analog protection level specifications transmitted from the D/A converter; and
    an over-discharge current comparator that compares voltages for the charge and discharge currents measured by the measurement unit with voltages for the over-discharge reference currents of the analog protection level specifications transmitted from the D/A converter.

6. The protection circuit of claim 5, wherein the comparison unit further comprises a short-circuiting comparator that compares the charge and discharge voltages measured by the measurement unit with a fixed short-circuiting reference voltage.

7. The protection circuit of claim 6, wherein the protection level specifications stored in the storage unit further include a short-circuiting reference voltage for determining whether the battery is short-circuited.

8. The protection circuit of claim 1, wherein the charge/discharge FET comprises:
 a charge FET connected between the cell terminal and the external terminal and is turned off under the control of the controller unit if the charge and discharge voltages and the charge and discharge currents measured by the measurement unit exceed one of the over-charge reference voltage and the over-charge reference current of the analog protection level specifications; and
 a discharge FET connected to the charge FET in series between the cell terminal and the external terminal and is turned off under the control of the controller unit if the charge and discharge voltages and the charge and discharge currents measured by the measurement unit are less than one of the over-discharge reference voltage and the over-discharge reference current of the analog protection level specifications.

9. A battery pack, comprising:
 a battery selected from a plurality of batteries, each battery having associated characteristics; and
 a protection circuit, comprising:
  an external terminal configured to be connected to a charger or an external device;
  a cell terminal configured to be connected to a battery;
  a storage unit for storing a plurality of protection level specifications, wherein the specifications include data of over-charge and over-discharge reference currents and over-charge and over-discharge reference voltages for protecting the battery;
  a digital-to-analog (D/A) converter electrically connected to the storage unit and configured to read the protection level specifications stored in the storage unit and to convert the protection level specifications into analog protection level specifications as analog data;
  a measurement unit connected to the cell terminal and configured to measure charge and discharge voltages and charge and discharge currents of the battery;
  a comparison unit electrically connected to the measurement unit and the D/A converter and configured to compare the charge and discharge voltages and the charge and discharge currents measured by the measurement unit with the analog protection level specifications from the D/A converter;
  a charge/discharge field effect transistor (FET) connected between the cell terminal and the external terminal in series and configured to be turned off during over-charge and over-discharge;
  a controller unit electrically connected to the comparison unit and the charge/discharge FET, and configured to determine over-charge and over-discharge according to a signal output from the comparison unit, and configured to control driving of the charge/discharge FET; and
 wherein the storage unit stores a plurality of protection level specifications and is configured to read one of the protection level specifications according to characteristics of the selected battery.

10. The battery pack of claim 9, wherein the storage unit receives and stores protection level specifications based on characteristics of the battery.

11. The battery pack of claim 10, further comprising a data input terminal electrically connected to the storage unit and configured to transmit the protection level specifications to the storage unit.

12. The battery pack of claim 9, further comprising a data input terminal electrically connected to the storage unit and configured to select one of the protection level specifications stored in the storage unit to be read.

13. The battery pack of claim 9, wherein the comparison unit comprises:
 an over-charge voltage comparator that compares the charge and discharge voltages measured by the measurement unit with the over-charge reference voltage of the analog protection level specifications transmitted from the D/A converter; and
 an over-discharge voltage comparator that compares the charge and discharge voltages measured by the measurement unit with the over-discharge reference voltage of the analog protection level specifications transmitted from the D/A converter.

14. The battery pack of claim 13, wherein the comparison unit comprises:
 an over-charge current comparator that compares voltages for the charge and discharge currents measured by the measurement unit with voltages for the over-charge reference currents of the analog protection level specifications transmitted from the D/A converter; and
 an over-discharge current comparator that compares voltages for the charge and discharge currents measured by the measurement unit with voltages for the over-discharge reference currents of the analog protection level specifications transmitted from the D/A converter.

15. The battery pack of claim 14, wherein the comparison unit further comprises a short-circuiting comparator that compares the charge and discharge voltages measured by the measurement unit with a fixed short-circuiting reference voltage.

16. The battery pack of claim 15, wherein the protection level specifications stored in the storage unit further include a short-circuiting reference voltage for determining whether the battery is short-circuited.

17. The battery pack of claim 9, wherein the charge/discharge FET comprises:
 a charge FET connected between the cell terminal and the external terminal and is turned off under the control of the controller unit if the charge and discharge voltages and the charge and discharge currents measured by the measurement unit exceed one of the over-charge reference voltage and the over-charge reference current of the analog protection level specifications; and
 a discharge FET connected to the charge FET in series between the cell terminal and the external terminal and is turned off under the control of the controller unit if the charge and discharge voltages and the charge and discharge currents measured by the measurement unit are less than one of the over-discharge reference voltage and the over-discharge reference current of the analog protection level specifications.

* * * * *